R. H. HELSEL.
WEIGHING SCALE.
APPLICATION FILED MAR. 30, 1917.

1,242,551.

Patented Oct. 9, 1917.

INVENTOR:
Reuben H. Helsel,
By his Attorney, John O. Seifert

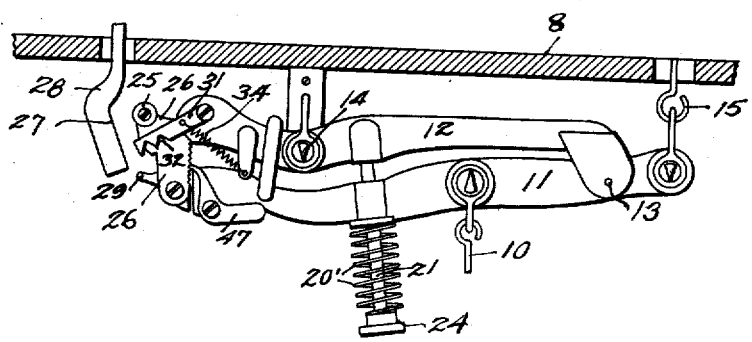
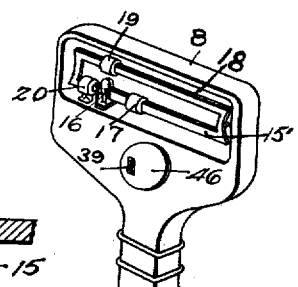
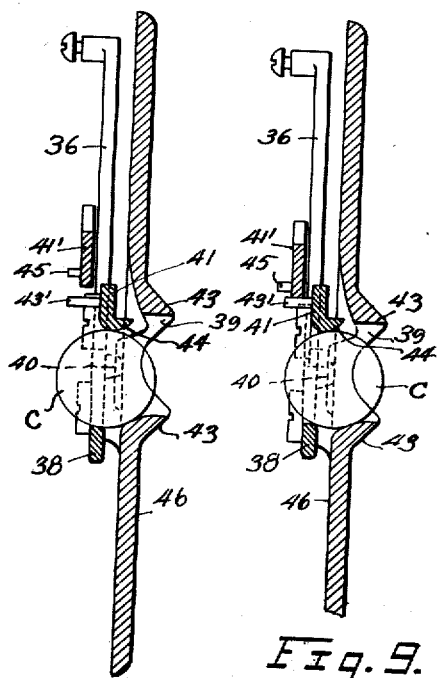
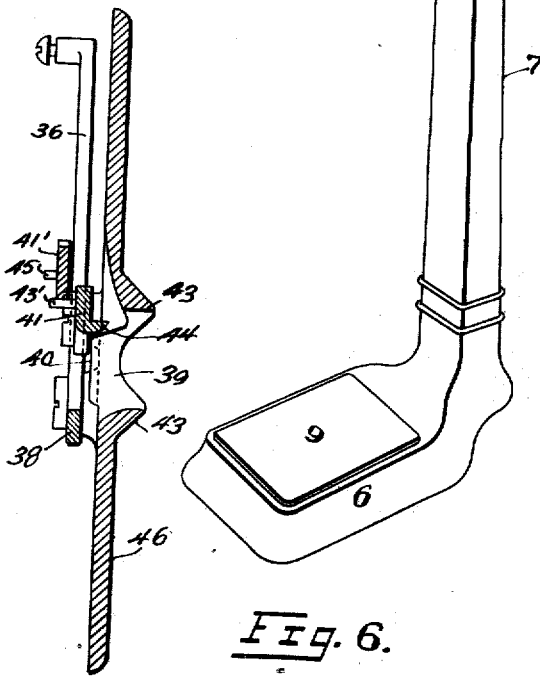

UNITED STATES PATENT OFFICE.

REUBEN H. HELSEL, OF NEW YORK, N. Y., ASSIGNOR TO COLUMBIA WEIGHING MACHINE COMPANY, OF NEW YORK, N. Y., A CORPORATION OF NEW YORK.

WEIGHING-SCALE.

1,242,551.      Specification of Letters Patent.      Patented Oct. 9, 1917.

Application filed March 30, 1917. Serial No. 158,517.

*To all whom it may concern:*

Be it known that I, REUBEN H. HELSEL, a citizen of the United States, and a resident of the borough of Manhattan, in the city, county, and State of New York, have invented certain new and useful Improvements in Weighing-Scales, of which the following is a specification.

This invention relates to weighing scales of the type shown in my co-pending application filed January 26, 1916, Serial No. 74,307 in which the weight of a load on a platform or receiver is registered on a scale beam or beams by the adjusting of a weight on the scale beam by the person using the scale, and in which means are provided to permit the weighing of a load within a predetermined weight and to prevent the operation of the scale beam by a load on the receiver greater than such predetermined weight, said means being releasable by coin controlling means to permit the operation of the scale beam and the weighing of a load greater than such predetermined weight.

In the scale shown in my prior application hereinbefore referred to the coin controlled means are operable after a coin has been deposited in a coin slot by the manual operation of a lever, and it is the object of the present invention to provide means to release the means preventing the operation of the scale beam operable by a coin as it is deposited in a coin slot.

A further object of the invention is to provide means to prevent the operation of the means actuated by a deposited coin to release the means preventing the operation of the scale beam by an instrument other than a coin inserted in the coin shot.

In the drawings accompanying and forming a part of this specification Figure 1 is a front elevation of the upper portion of a weighing scale, with the casing broken away, showing the weighing levers and connected scale beam with an embodiment of my invention applied thereto.

Fig. 6 is a perspective view of a weighing scale showing the general type of scale to which my invention has been applied.

Fig. 7 is a view similar to Fig. 2 but showing the parts in position after the coin has been deposited and permitting the weighing of a load greater than the predetermined weight; and Figs. 8, 9 and 10 are side elevations, partly in section, of the coin actuated means shown in Figs. 3, 4 and 5.

Similar characters of reference designate like parts throughout the different views of the drawings.

Figure 1:
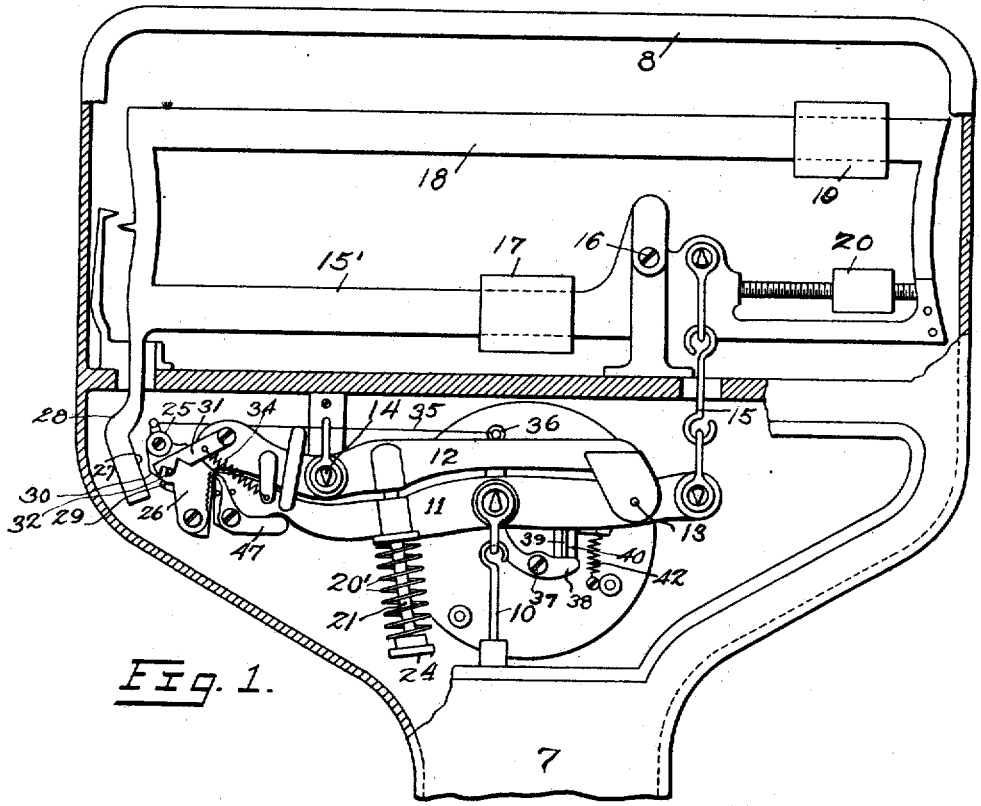
Figure 2:
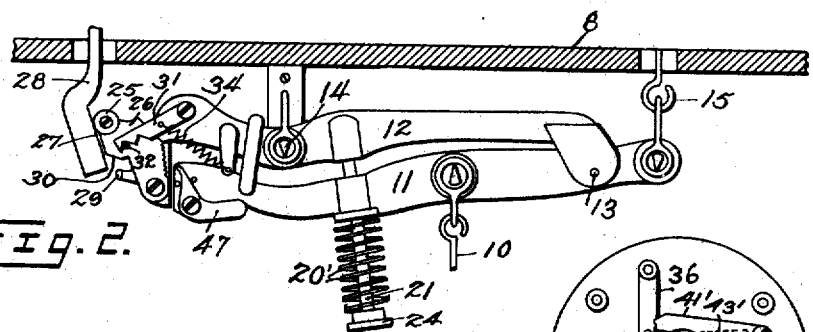
Fig. 2 is a front elevation of the weighing levers through which the load receiver is connected with the scale beam with my invention applied thereto, the parts being in position to prevent the operation of the scale beam and the weighing of a load greater than a predetermined weight.

The embodiment of my invention shown in the drawings comprises a base 6 having an upright hollow column 7, said column supporting at its upper end an open frame 8 in which the scale beam is located. A load receiver or platform 9 is supported in an opening in the top of the base 6 by suitable platform supporting levers (not shown) connected by a draft rod 10 extending up through the column 7 to an auxiliary weighing lever 11, said lever being pivotally carried by a main lever 12, as at 13, and said latter lever pivotally supported by knife edge bearings, as at 14. The auxiliary lever 11 is connected at one end to a scale beam by a link 15, said scale beam being of the usual duplex structure having the main beam 15' pivotally supported, as at 16, and carrying the sliding counterweight 17, and an auxiliary beam 18 connected to the beam 15' on which is adjustably mounted a weight 19, said scale beam having the usual adjusting means as shown at 20.

As stated it is an object of the invention to permit the weighing of a load within a predetermined weight and to prevent the weighing of a load greater than such predetermined weight. For this purpose there is provided between the weighing levers 11 and 12 a spring 20' coiled about a threaded stem 21 fixed to lever 12 to extend down through an opening in the lever 11, the spring being confined between the lever 11 and a knurled nut 24 on the end of the stem. By this construction as a load is placed on the receiver 9 it will swing the lever 11 on the pivot 13 against the tension of the spring 20' and actuate the scale beam through the link 15. However, when the load on the receiver is of such weight that it will not further compress the spring 20' the weight of the load will be taken up through the lever 11 by lever 12, said levers then acting as a unit and imparting movement to the scale beam through the link 15. As soon as movement is imparted to the lever 12 by the load a friction member 25, in the form of a disk of suitable friction material, such as fiber, felt, leather, rubber or the like, carried by the end of a dog 26 pivotally mounted on a downward projecting portion of the lever 12, engages with a cam surface 27 on a depending portion 28 of the scale beam and thereby prevents actuation of the latter. This friction member, during the weighing of a load within a predetermined weight through the lever 11, is maintained out of engagement with the cam surface 27 by a projection 29 extending laterally from the lever 11 engaging with a beveled face 30 on said dog. As the lever 11 moves down and the projection slides down on the beveled face 30 and the lever reaches the limit of this movement which is regulated through the spring 20' by the nut 24, the friction member will engage with the cam surface 27. However, to assure the forcible engagement of this member with the cam surface there is provided a detent 31 having a pair of V notches in either one of which notches a pin 32 extending laterally from the dog is adapted to engage, said pin being substantially of inverted V-shape in cross section. In the normal position of the parts this pin will be caused by the projection 29 of the lever 11 engaging with the beveled face 30 to assume a position so that one beveled side of the pin will engage with the beveled side of the tooth formed by the V notches in the detent 31 adjacent its apex, as shown in Fig. 1. Should the load on the receiver be sufficient to overcome the tension of the spring 20' the pin will ride up the inclined surface of such tooth and the friction member engage with the cam surface 27 until the pin 32 will be at the bottom of the recess at the outer end of the detent 31, the pin being caused to assume such position by the tension of a spring 34 connected to the detent.

It will be obvious that the greater the load on the receiver the greater will be the frictional contact between the member 25 and the cam surface 27. By the adjustment of the nut 24 on the stem 21 the tension of the spring 20' will be increased or decreased and thereby the limit to be weighed is determined without interfering with the operation of the scale beam, and it will be obvious that this may be varied to suit requirements.

To throw the friction member 25 out of engagement with the cam surface 27 of the scale-beam the dog 26 is connected by a rod or wire 35 with one arm 36 of a two armed lever. The lever is pivotally supported, as at 37, within the column 7 of the scale casing with the other arm 38 of the lever extending across the lower end of the coin slot 39 and adapted to engage with ledges 40 projecting from the inner surface of the wall of the casing at opposite sides of the coin slot but being of less length than the slot for a purpose to be hereinafter described.

Figure 3:
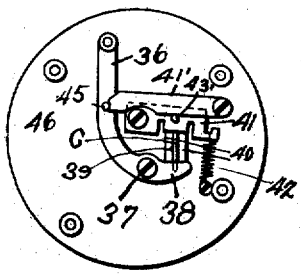
Fig. 3 is a view looking at the rear of the means actuated by the depositing of a coin in a coin slot to release the weighing mechanism to permit the weighing of a load greater than a predetermined weight, and showing the parts in normal position.

The lever is normally locked against movement with the one arm 38 engaging with the ledges 40 by the end of a pivotally supported latch 41' engaging with a pin 45 projecting from the lever arm 36. The latch normally engages by gravity with a pin 43' projecting from a second latch 41. The latch 41 is normally maintained in position to engage with the upper end of the ledges 40 by a spring 42 and thereby permitting the latch 41' to assume a position to engage with the pin 45. The ledges 40 being of less length than the coin slot the latch 41 also engages in back of a portion of the slot adjacent the top thereof, the latches and lever assuming the positions shown in Fig. 3.

Figure 5:
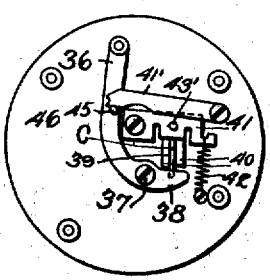
Fig. 5 is a view similar to Fig. 3 but showing the parts in the position they will assume as the coin passes through the coin slot and actuating means to release the means preventing the weighing of a load greater than a predetermined weight.
Figure 4:
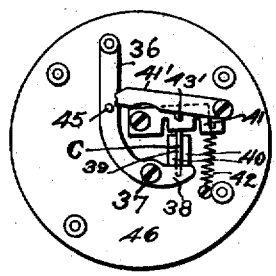
Fig. 4 is a view similar to Fig. 3 but showing the position to which the parts are moved during the initial movement of inserting a coin in the coin slot.

The friction member 25 is adapted to be thrown out of engagement with the friction surface 27 of the scale-beam by the insertion of a coin C in the coin slot. The entering end of the coin slot is made of segmental shape by providing forwardly extending projections 43 adjacent the top and bottom of the coin slot, and the bottom wall of the slot inclines downwardly from the outer to the inner surface of the casing, as clearly shown in Figs. 8, 9 and 10. As a coin is inserted into the slot the lower portion of the coin will ride or roll over the upper end of the inclined bottom of the slot, and the edge of the coin adjacent the top will engage with a cam surface 44 formed on the latch 41 moving the latch upward and with it the latch 41' throwing the latter out of engagement with the lever pin 45 and away from the coin slot, as shown in Figs. 4 and 9. As the coin is pushed or rolled farther into or through the coin slot the pressure of the latch 41 on the coin through the spring 42 will cause the coin to forcibly engage with the arm 38 of the lever (as shown in Figs. 5 and 10) moving said lever arm downward and thereby throw the arm 36 and through its connection with the friction member carrying dog 26 it will pull the dog carrying the friction member 25 backward against the action of the spring detent 31 and cause the pin 32 to engage in the second recess in the detent thereby holding the friction member out of engagement with the cam surface 27 and permitting of the free actuation of the scale-beam. It will be noted that the coin slot is located in and the lever 36, 38 and latches 41, 41' are mounted upon a plate 46 removably secured in an opening in the column of the casing. This facilitates the assembling of this mechanism and permits the ready removal of the same for repairs and substitution of parts.

As soon as a load is removed from the receiver 9 the tension of the spring 20' will cause the weighing lever 11 to assume its normal position adjacent the lever 12, as shown in Fig. 1, and during this movement of the lever 11 a pawl 47 pivotally carried by the lever 11, which had previously been caused to engage with one of a series of serrations or teeth on the back of the dog 26 when the latter was thrown to the position with the friction member out of engagement with the cam surface 27 of the scale beam by the operation of the lever 36, 38 with the pin 32 in engagement with the second recess in the detent 31, will exert a forward pressure on the dog 26 throwing the pin 32 out of engagement with the second detent recess against the action of the spring 34 and cause said pin to engage in the recess adjacent the end of the detent and the dog to be in position whereby the friction member 25 may engage with the friction surface 27 of the scale-beam when a load greater than a predetermined weight is placed upon the load receiver, and permit the weighing of loads which come within such predetermined weight.

The provision of the forwardly extending projections 43 at the top and bottom of the coin slot and the inclining of the bottom wall of the slot prevents the actuation of the latch 41 and lever 36, 38 by the insertion of an instrument other than a coin, such as a knife blade or the like, in the coin slot to release the locking means of the weighing mechanism to permit the weighing of a load greater than a predetermined weight.

Having thus described my invention I claim:

1. In a weighing scale the combination with weighing mechanism including a scale-beam and a load-receiver connected thereto, of a casing to carry the weighing mechanism and inclosing a portion thereof having a coin slot; means operable by a load placed upon the load-receiver to prevent the actuation of the scale-beam; and means operable by a coin deposited in and during its passage through the coin slot with a load upon the load-receiver to release said means preventing the actuation of the scale and permit the weighing of a load on the load-receiver.

2. In a weighing scale the combination with weighing mechanism including a load-receiver, a scale-beam and a weighing lever to connect the load-receiver and scale-beam, of a casing to carry and inclose a portion of said weighing mechanism having a coin slot; means carried by the weighing lever to coöperate with the scale-beam to prevent the actuation of the latter by a load on the load-receiver; and means operable by a coin deposited in and during its passage through the coin slot with a load on the receiver to release said latter means from and permit the actuation of the scale-beam and the weighing of the load on the load-receiver.

3. In a weighing scale the combination with weighing mechanism including a load-receiver, a scale-beam and a weighing lever to connect the load-receiver and scale-beam, of a casing to carry the weighing mechanism and inclose a portion thereof having a coin slot; means operable by a load on the load-receiver to retard the actuation of the scale-beam; and means operable by a coin deposited in and during its passage through the coin slot with a load on the load-receiver to release said means to retard the actuation of the scale-beam and permit the weighing of the load on the load-receiver.

4. In a weighing scale the combination with weighing mechanism including a load-receiver, scale-beam and weighing lever to connect the load-receiver and scale-beam, of a casing to carry the weighing mechanism and inclosing a portion thereof having a coin slot; means operable to permit the actuation of the weighing mechanism and the weighing of a load on the load-receiver within a predetermined weight and to prevent the actuation of the weighing mechanism and the weighing of a load on the receiver greater than such predetermined weight; and mechanical means operable by a coin deposited in and during its passage through the coin slot to release said means preventing the actuation of the weighing mechanism and the weighing of the load greater than such predetermined weight on the load receiver.

5. In a weighing scale the combination of weighing mechanism including a load-receiver, a scale-beam and a weighing lever to connect the load-receiver and scale-beam; a casing to carry the weighing mechanism and inclosing a portion thereof having a coin slot; friction means to coöperate with the scale beam and normally out of engagement therewith to permit the weighing of a load on the load-receiver within a predetermined weight and thrown into operative engagement to retard the movement of the scale beam by a load on the load-receiver greater than such predetermined weight; and mechanically operated means actuated by a coin deposited in the coin slot to release said friction means and permit the weighing of such load greater than such predetermined weight on the load receiver.

6. In a weighing scale the combination of weighing mechanism including a load-receiver, a scale-beam and a weighing lever to connect the load-receiver and scale-beam; a casing to carry the weighing mechanism and inclosing a portion thereof having a coin slot; means carried by the weighing lever to coöperate with the scale-beam to prevent the actuation of the scale-beam by a load on the receiver; and a latch normally extending across a portion of the coin slot to coöperate with means through a coin deposited in the coin slot to release the means carried by the weighing lever and coöperating with the scale-beam to prevent actuation of the latter by the depositing of the coin and permit the weighing of a load on the receiver.

7. A weighing scale comprising a load-receiver; a scale-beam having a cam portion; a weighing lever to connect the load-receiver and scale-beam; a casing to carry the load-receiver, scale-beam and weighing lever and inclosing a portion thereof, said casing having a coin slot; a dog carried by the weighing lever to engage with the cam portion of the scale-beam to prevent the actuation of the latter by a load on the receiver; and a spring influenced latch normally extending across the coin slot to coöperate with means through a coin deposited in the coin slot to release the dog from the cam portion of the scale-beam upon the depositing of the coin, substantially as and for the purpose specified.

8. A weighing scale comprising a load-receiver; a scale-beam having a cam portion; a weighing lever to connect the load-receiver and scale-beam; a casing to carry the load-receiver, scale-beam and weighing lever and inclosing a portion thereof, said casing having a coin slot; a dog carried by the weighing lever to engage with the cam portion of the scale-beam to prevent the actuation of the latter by a load on the receiver; a spring influenced latch normally extending across a portion of the coin slot; and a lever connected to the dog, said lever being operable by the latch through a coin deposited in the coin slot to release the dog from the cam portion of the scale-beam by the depositing of the coin in the coin slot, substantially as and for the purpose specified.

9. In a weighing scale the combination with weighing mechanism including a scale-beam and a load-receiver connected thereto, of a casing to carry the weighing mechanism and inclosing a portion thereof having a coin slot; means operable by a load placed upon the load-receiver to prevent the actuation of the scale-beam; a latch extending across the coin slot operable by a coin deposited in and during its passage through the coin slot when a load is placed upon the load receiver to release said means preventing the actuation of the scale and permit the weighing of a load on the load-receiver; and means operable when the load is removed from the receiver to restore to initial position the means to prevent the actuation of the scale-beam by a load on the receiver.

10. In a weighing scale the combination with weighing mechanism including a load-receiver, a scale-beam and a weighing lever to connect the load-receiver and scale-beam, of a casing to carry the weighing mechanism and inclose a portion thereof having a coin slot; means operable by a load on the load-receiver to retard the actuation of the scale-beam; a latch extending across a portion of the coin slot operable by a coin deposited in and during its passage through the coin slot when a load is placed on the load-receiver to release said means to retard the actuation of the scale-beam and permit the weighing of a load on the load-receiver; and means operable when the load is removed from the receiver to return the means to retard the actuation of the scale-beam by a load on the receiver to initial position.

11. In a weighing scale the combination of weighing mechanism comprising a scale-beam, a load-receiver and weighing levers to connect the load-receiver and scale-beam; a casing to carry and inclose a portion of said weighing mechanism and having a coin slot; means carried by the weighing levers to coöperate with the scale-beam to prevent the weighing of a load on the load-receiver; a spring influenced pivoted latch normally extending across a portion of the coin slot; and means actuated by said latch through a coin deposited in the coin slot to release the means carried by the lever coöperating with the scale-beam to prevent the weighing of a load on the receiver and permit the weighing of a load on the receiver.

12. In a weighing scale, the combination of weighing mechanism including a scale beam having a cam portion, a load-receiver, and a weighing lever to connect the load-receiver and scale-beam; a casing to carry and inclose a portion of the weighing mechanism having a coin slot; a dog carried by the weighing lever operable to engage with the cam portion of the scale-beam by a load on the receiver and prevent the actuation of the scale-beam; a lever connected to the dog; a latch having a part to lock the lever against movement in the normal position thereof; and a second pivoted spring influenced latch normally extending across a portion of the coin slot, said latch being operable to actuate the first latch to release the lever and actuate the lever to release the dog from the cam portion of the scale-beam by a coin deposited in and during its passage through the coin slot, substantially as and for the purpose specified.

13. In a weighing scale, the combination of weighing mechanism including a scale-beam having a cam portion, a load-receiver, and a weighing lever to connect the load-receiver with the scale-beam; a casing to carry and inclose a portion of the weighing mechanism; a coin slot in said casing one end wall of which slot inclines downward from the outer to the inner surface of the casing and having ledges on the inner surface of the casing adjacent the coin slot and of less length than the coin slot; a dog carried by the weighing lever operable to engage with the cam portion of the scale beam by a load on the receiver to prevent the actuation of the scale-beam; a lever connected to the dog having a part engaging with the ledges and extending across that portion of the coin slot having the inclined wall; a latch coöperating with said lever to lock the same against movement; and a second pivoted spring influenced latch normally engaging with the ledges and extending across a portion of the coin slot at the end opposite to the inclined wall of the slot; said lever being released by the lever locking latch and operable by the second latch to release the dog from the cam portion of the scale-beam through a coin deposited in the coin slot, substantially as and for the purpose specified.

14. In a weighing scale the combination of a scale-beam having a cam portion; a receiver for the load to be weighed; weighing levers to connect the load-receiver with the scale-beam; a casing to carry the scale-beam, load-receiver and weighing levers and inclosing the latter and the connection thereof with the load-receiver; a coin slot in the casing one end wall of the slot inclining downward from the outer to the inner surface of the casing; a ledge on the inner surface of the casing adjacent the coin slot and of less length than the slot; a dog carried by the weighing levers operable to engage with the cam portion of the scale-beam by a load on the receiver to prevent actuation of the scale-beam; a pivoted spring-influenced latch normally engaging with the ledge and extending across a portion of the coin slot at the end opposite to the inclined end wall of the slot; a bell-crank lever having one arm connected to the dog and the other arm normally engaging with the ledge and extending across a portion of the coin slot at the end having the inclined wall and locked in such position by the latch, said lever being unlocked by the latch upon the depositing of a coin in the coin slot and operable by said latch through the deposited coin to release the dog from the cam portion of the scale-beam substantially as and for the purpose specified.

Signed at New York city, in the county of New York, and State of New York.

REUBEN H. HELSEL.

Witnesses:
W. H. KEICKNER,
IDA A. KESSLER.

Copies of this patent may be obtained for five cents each, by addressing the "Commissioner of Patents, Washington, D. C."